Nov. 30, 1948.       D. F. STEVENS              2,455,101
                    ROCKET PROJECTOR
                   Filed Sept. 16, 1946
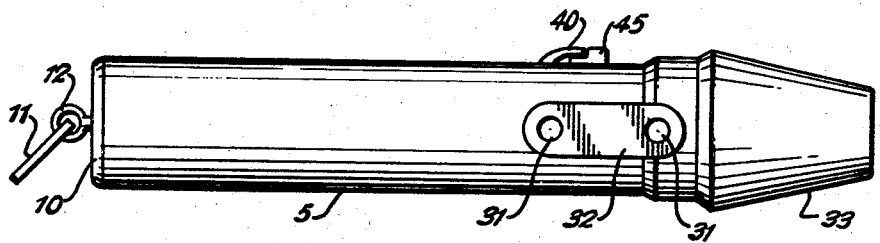
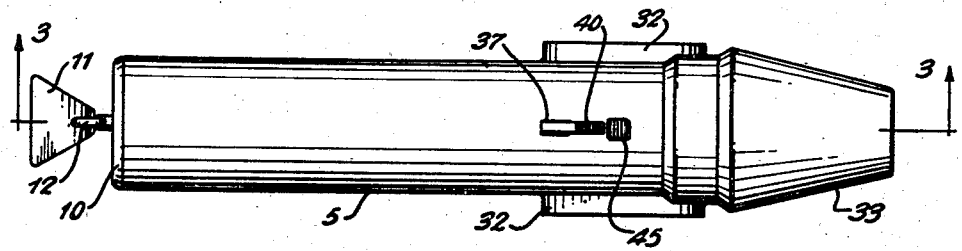
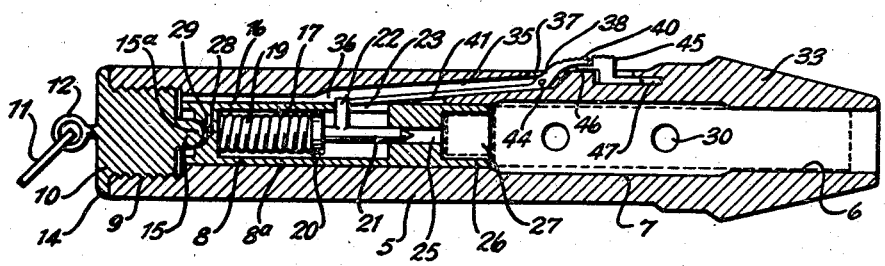
Inventor
*Douglas F. Stevens.*
By *Clarence A. O'Brien
and Harvey B. Jackson*
Attorneys Patented Nov. 30, 1948

2,455,101

UNITED STATES PATENT OFFICE 2,455,101

ROCKET PROJECTOR

Douglas F. Stevens, Pasadena, Calif.

Application September 16, 1946, Serial No. 697,344

2 Claims. (Cl. 42—1)

This invention relates to rocket projectors and it has for its general object to provide a projector of simplified shape and construction which is easily operated, will work reliably and will provide a greater safety against back blasts during firing than the projectors hitherto known.

The invention in accordance with the above explained object comprises a projector tube provided with a plurality of communicating central cylindrical bores, one of which is larger than the other bores and forms the ignition chamber. The portion of the projector tube surrounding said chamber is reinforced by reinforcing guard portions and transverse channels lead directly and in the shortest way from said ignition chamber to the outside. These channels discharge and permit the exhausting of the propelling gases during firing and prevent back blasts directed towards the operator. The bore behind the ignition chamber houses a firing mechanism which consists of a block with a solid bottom provided with a plurality of intercommunicating central bores of different diameters. The portion of the projector tube surrounding the aforesaid bore and firing mechanism is provided with a longitudinal channel slightly inclined towards the axis of the tube which leads to the outside and houses the trigger release mechanism.

The rearmost bore portion is larger than the other bores and is screw threaded. It engages a breech plug which may be removed for loading purposes and which presses upon and holds the firing mechanism and closes the projector tube.

The firing mechanism includes a compression spring, a firing pin and a locker pin, the latter projecting outwardly so as to be able to engage a trigger release member.

This construction permits great simplicity of shape and of operation. It also provides great security as the projector is completely sealed and closed in the rear so that no back blasts may occur which are directed towards the operator.

The invention will be more fully understood when described with reference to the accompanying drawing illustrating one embodiment of the invention. This embodiment is an example serving to explain the principle on which the invention is based. Other embodiments may be constructed by the experts by following the rules laid down in this specification and are obviously not departures from but part of the invention.

In the accompanying drawing—

Figure 1 is an elevational side view of the rocket projector.

Figure 2 is a plan view of the same.

Figure 3 is a sectional elevational view of the projector, the section being a longitudinal section along the line 3—3 of Figure 2.

The rocket projector according to the invention consists of the projector tube 5 which is provided with a central bore 6, part of which constitutes the ignition chamber 7 of the projector while another part 8a houses the firing mechanism 8. At the end of the projector a threaded bore 9 of larger diameter is arranged which receives the breech plug 10, closing the tube at this end. The threaded bore 9 is of a diameter which is larger than the central portion of the bore in order that the firing mechanism 8 may be withdrawn through this bore without difficulty.

The breech plug is provided at one end with a flange 14 which is screwed down on the end of the projector tube, limits the inward movement and improves a tight seal. The end of the plug carries a ring 12 projecting outwardly to which a tab 11 is attached. By means of the tab 11 the plug can be easily screwed down into the tube or unscrewed from its seat so that it frees the opening. It is obvious that the tab hooked into the ring is merely shown by way of example, and that other means for screwing the breech plug down or for disengaging it may be used.

At its inner end the breech plug is provided with a central protuberance or projection 15 which has preferably the shape of a cylindrical pin with a rounded or spherical end portion 15a.

In the bore 8a between the breech plug 10 and the ignition chamber 7 the firing mechanism 8 is housed which consists of a cylindrical block 16 provided with a number of cylindrical cavities. The largest cavity 17 in the rear part of the block houses a coiled compression spring 19 pressing upon a disk 20 from which the cylindrical and pointed firing pin 21 projects. This firing pin is provided with a lateral lock pin 22 projecting through a slot 23 of the block which communicates with the cavity 17.

The cavity 17 communicates by means of a cylindrical channel 25 of a diameter substantially equal to the diameter of the firing pin 21 with a cylindrical cap chamber 26 located in the foremost portion of the block. This chamber receives the percussion cap or cartridge 27 by means of which the rocket is fired.

The rear end of the block 16 is completely closed. The closing bottom portion 28 may be slightly recessed with respect to the end face and it is provided at its center with a rounded or spherical groove 29 which receives the rounded or spherical head 15a of the central protuberance or pin 15 of the breech plug 10.

The ignition chamber 7 which is of larger diameter than the bore 6 receives the end of the rocket and is provided with lateral gas ports 30 through which the gases may escape. These gas ports 30 lead to transverse channels 31 in communication with the outer air. Guard pieces 32 may be arranged on each side of the projector which are traversed by said channels.

The gas ports 30 form an outlet for the propelling gases and discharge these gases on the side of the projector tube at a safe distance from the operator of the tube. The danger of a back blast towards the operator when the projector is fired is then avoided.

The ignition chamber 7 is joined to the firing head 33 containing the bore 6.

Above the firing mechanism 8 the tube is provided with a further channel 35 arranged longitudinally but somewhat inclined with respect to the tube axis which communicates with the section 8a of the central bore by means of an elongated opening 36 and which ends in a slot 37 on the outside of the tube. This channel houses the trigger release lever 38 which in the example shown is merely a two armed lever, with a short trigger arm 40 and a long release arm 41. The lever is fulcrumed by means of a pin 44 near the slot 37, and the trigger 40 projects through the slot outwardly and may be bent or curved so as to offer a convenient thumb piece which is milled knurled or provided with small corrugations or teeth.

The release arm 41 projects into the interior of the bore 8a through the elongated opening 36, and rests on the lateral lock member 22 of the firing pin 21. The channel 35 is sufficiently wide to permit a certain angular movement of the release arm around its fulcrum, on account of the position and length of the lever 41 a movement through a small angle is sufficient to move the end of the lever 41 out of engagement with lock member 22.

Near the trigger arm 40 a safety lock 45 may be provided. It consists in a small slidable locking member, provided with a tongue 46 forcing the trigger 40 outwardly and the release lever 41 inwardly until it contacts the walls of the channel and thereby prevents any movement of the trigger. The safety lock member is slidably mounted in a slot 47 and may be removed so as to be out of engagement by moving it away from the trigger within said slot.

The operation of the projector will be clear from the above description.

To load the projector, the tab 11 is seized and is twisted to remove the breech plug 10 and the firing mechanism block 16. Then the cap is inserted into the cap chamber 27 and the rocket charge into the ignition chamber 7.

Now the block 16 with the firing mechanism 8 is replaced and the plug 10 is screwed in. When the block 16 is moved forwardly the compression spring 19 is compressed and the firing pin 21 is held by means of the locker arm 22 and the release lever 41. The safety lock 45 is slid into locking position and the projector is now loaded.

When the rocket is to be fired the safety lock 45 is first removed by sliding it forwardly within its slot 47. When the trigger 40 is now pressed the release arm 41 is disengaged from the locker arm 22, the firing pin slides forward under the pressure of the spring 19 and pierces and strikes the cap 27. The cap now ignites the rocket charge. The propelling gases are exhausted through the ports 30 and channels 31.

The projector as described is simple and efficient and is safer to operate than the rocket projectors now in use.

I claim:

1. A rocket projector comprising a projector tube, provided with central cylindrical bores of different diameter communicating with each other, one of said bores being of enlarged diameter and forming the ignition chamber, reinforcing guards on said tube on both sides of the ignition chamber and lateral channels leading from the ignition chamber transversely and directly to the open air, a further bore adjacent to the ignition chamber, a firing mechanism housed in said bore, said mechanism including a cylindrical block filling the aforesaid bore of the projector tube, and provided itself with a plurality of cylindrical central bores of different diameter, and with a closing bottom portion, one of said bores of large diameter being the ignition cap bore, a firing pin and a compression spring for moving the same housed within said bores, means for holding said firing pin under the pressure of the compression spring including a locker arm on said firing pin and a trigger release arm for locking said arm and pin, and a breech plug inserted into the rearmost of the bores of the projector tubes and held therein, provided with a central projection applied against the bottom of the firing block and holding said block in its place.

2. In a rocket projector, a projector tube provided with a plurality of central bores, a firing head, reinforcement guards, said bores including a firing head bore, an ignition chamber of larger diameter than the aforesaid bore, a firing mechanism bore, and a screw threaded bore of larger diameter at the rear end of the projector, transversely directed lateral channels leading from said ignition chambers through said reinforcing guards directly to the outside, a substantially longitudinal channel inclined with respect to the axis of the tube leading from the firing mechanism bore to the outside, a firing mechanism within the last-mentioned bore comprising a block with a closed bottom and a plurality of central bores of different diameter, a slot in said block leading from the rearmost bore of the block to the outside, a compression spring housed in said rearmost bore, a firing pin pressed forwardly by said compression spring, said firing pin being guided in one of the bores of the block forming a guide bore, the foremost central bore in the firing mechanism block being an ignition cap bore for housing the said cap, a locker arm projecting from said firing pin through the aforesaid slot outwardly, a trigger release mechanism including a release arm housed in said longitudinal inclined slot of the projector tube and cooperating with said locker arm, a breech plug provided with screw threads, engaging the screw threads of the rearmost bore of the projector tube, and further provided with a projecting pin, adapted to press against the bottom of the firing block and with means for screwing and unscrewing said breech plug by hand.

DOUGLAS F. STEVENS.

REFERENCES CITED

The following references are of record in the file of this patent:

UNITED STATES PATENTS

| Number | Name | Date |
|---|---|---|
| 1,681,172 | Cocho | Aug. 21, 1928 |
| 1,994,295 | Williams | Mar. 12, 1935 |
| 2,001,405 | Abbott | May 14, 1935 |
| 2,042,934 | Gill | June 2, 1936 |

FOREIGN PATENTS

| Number | Country | Date |
|---|---|---|
| 126,336 | Great Britain | May 15, 1919 |
| 611,076 | France | June 26, 1926 |